United States Patent

[11] 3,562,425

[72] Inventor Raymond Poirier
Paris, France

[21] Appl. No. 657,937
[22] Filed Aug. 2, 1967
[45] Patented Feb. 9, 1971
[73] Assignee CSF-Compagnie Generale De Telegraphie Sans Fil
a corporation of France
[32] Priority Aug. 10, 1966
[33] France
[31] 72,712

[54] IMAGE SIGNAL GENERATING SYSTEM
10 Claims, 14 Drawing Figs.

[52] U.S. Cl. ........ 178/7.2, 250/211
[51] Int. Cl. ........ H04n 3/14
[50] Field of Search ........ 178/7.2, 7.1; 307/203, 169, 308A, 308B, 308C, 308D; 315/169; 250/211, 211J; 313/108A, 108B, 108C, 108D

[56] References Cited

UNITED STATES PATENTS

| | | | |
|---|---|---|---|
| 3,111,556 | 11/1963 | Knoll et al. | 178/7.1 |
| 3,400,273 | 9/1968 | Horton | 178/7.1 |
| 3,378,688 | 4/1968 | Kabell | 250/211J |
| 3,423,527 | 1/1969 | Collins | 313/108 |

*Primary Examiner*—Richard Murray
*Assistant Examiner*—Alfred H. Eddleman
*Attorney*—Cushman, Darby and Cushman

ABSTRACT: A metal oxide semiconductor photosensitive capacitor, which comprises a negatively biased metal layer, deposited on a layer of insulating material transparent to photons. This latter layer rests on a layer of doped semiconductor material, which has an ohmic contact. A load resistance connects this contact to ground. Said load collects the current flowing across the diode during negative pulses canceling the biasing. The intensity of this current is a linear function of the photon flux received by the capacitor.

IMAGE SIGNAL GENERATING SYSTEM

Known television cameras comprise vacuum tubes which are difficult to miniaturize. Yet space requirements may be critical under certain conditions, for example in the case of space vehicles.

It is an object of the present invention, to avoid this drawback, by providing a photosensitive system for generating television signals which does not require the use of vacuum tubes.

According to the invention, there is provided a metal oxide semiconductor photosensitive device, comprising at least one metal oxide semiconductor capacitor, including a first layer of doped semiconductor, a second layer of insulated material covering at least partly said first layer and carrying a conductive terminal layer, an ohmic contact on said first layer; means for biasing said third layer with respect to ground; means for applying between said third layer and said contact short pulses, canceling said biasing; and means connected to said ohmic contact for collecting the current flowing through said capacitor during said pulse upon illumination of said capacitor.

For a better understanding of the invention and to show how the same may be carried into effect, reference will be made to the drawings accompanying the following description in which.

Figures 1, 2, 3:
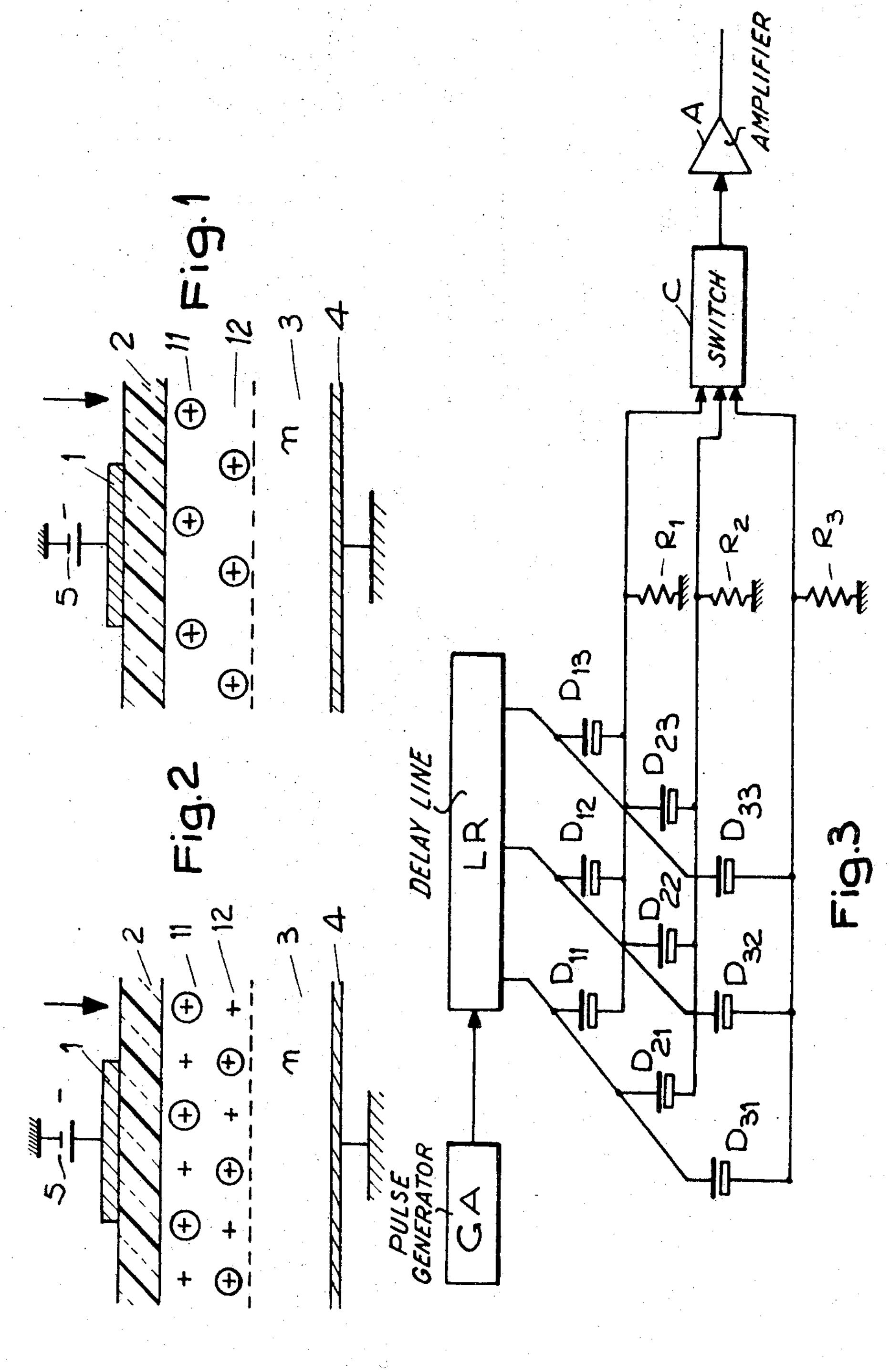
FIG. 1 Represents an MOS capacitor.
FIG. 2 shows the same after application of a voltage.
FIG. 3 shows diagrammatically the structure according to the invention.

FIG. 1 shows a metal —oxide —semiconductor structure, or a so-called MOS structure. This structure comprises a metal contact 1, deposited on an insulating layer transparent to photons 2, for example, of silica, which is supported by a layer 3 of a silicon semiconductor material, for example of the *n*-type. An ohmic contact 4 connects the assembly to earth. The contact 1 is negatively biased by a battery 5.

It will be first assumed that the structure of FIG. 1 is in the darkness.

A voltage —V is applied to the contact 1. FIG. 2 shows the state of the MOS capacitor at that instant.

The electrons are set in motion and in the vicinity of the surface separating the bodies 2 and 3, there is formed in the semiconductor a layer 12 of positive donor atoms represented by signs "plus" surrounded by a circle. Hole-electron pairs being thermally formed, the holes concentrate within the layer 12. They are represented in FIG. 2 by signs "plus."

A time interval $\tau$ may be defined by the following equation:

$$\tau=\tau_0\frac{Nd}{ni}$$

wherein Nd is the quantity of donor atoms in 1 cm$^3$, $n_i$ is the intrinsic concentration in 1 cm$^3$ of the semiconductor 3 and $\tau_0$ is the lifetime of the minority carriers.

In the present instance, i.e. of the body 3 is silicon with a resistivity of 500 ohms/cm, $Nd = 10^{13}$ and $n_i = 1{,}5.10^{10}$ and $\tau_0 =\pm 15$ $\mu$s.

Accordingly, in the present instance, $$\tau=15\mu s.\frac{10^{13}}{1{,}5.10^{10}}=10ms.$$

If now the semiconductor is submitted to the action of light, to the thermal generation of electron-hole pairs a generation of such pairs under the photon impacts is added (FIG. 2).

It can be shown that the quantity of the electric charges accumulated at the end of a time $t << \tau$ can be written as follows:

$Q=Q_0+K$ where is the intensity of the light flux, and $Q_o$ *a constant.*

According to the invention there is provided a system capable of forming television image signals by using the above described phenomenon.

A structure according to the invention is shown in FIG. 3.

This FIG. shows three lines of three capacitors each, forming also three columns, namely $D_{11}$, $D_{12}$, $D_{13}$ in the first line, $D_{21}$, $D_{22}$, $D_{23}$ in the second line, and $D_{31}$, $D_{32}$, $D_{33}$ 33 in the third line.

The ohmic contacts 4 of the capacitors $D_{11}$, $D_{12}$, $D_{13}$ are connected in parallel to a resistance $R_1$, whose other terminal is earthed.

Similarly, the ohmic contacts 4 of the capacitors $D_{21}$ to $D_{23}$ are connected to a resistance $R_2$, and the contacts of capacitors $D_{31}$ to $D_{33}$ to a resistance $R_3$.

An amplifier A and resistance three position switch C are connected to the three resistances in parallel. The switch C cyclically switches, according to a timing described further below, the resistances $R_1$, $R_2$, $R_3$ to the amplifier A.

The metal layers of the column 1, comprising capacitors $D_{11}$, $D_{21}$ and $D_{31}$ are connected to a first output of a delay line LR. Similarly those of the second column are connected to a second output and those of the third column to a third output.

This delay line is connected to a pulse generator GA.

Figure 4:
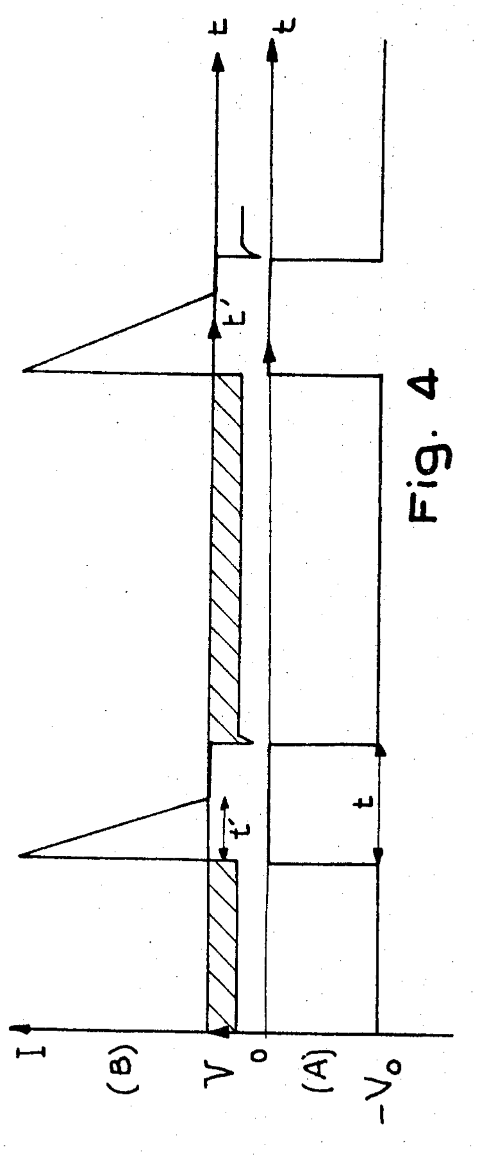
FIGS. 4 to 6 Are explanatory graphs.

The operation of this assembly will now be described:

FIG. 4 shows at A the variation of the voltage V applied to the terminals of an MOS element subjected to light radiation. This voltage is normally equal to —V, but is periodically brought to zero value by voltage pulses having a duration $t << \tau$, where $t$ is of the order of 30 to 40 $\mu$s.

There is shown at B the current I which flows through the load resistance connected between the ohmic contact 4 and ground. The current is normally zero, but assumes a strong positive value during the application of the pulses and returns to zero for a period of $t' < t$.

At the end of the applied voltage pulse, there appears a negative current pulse, which then assumes its constant zero value.

It may be shown that the peak values of the current I, in the capacitors, are linear functions of the incident light flux.

Figures 5, 6:
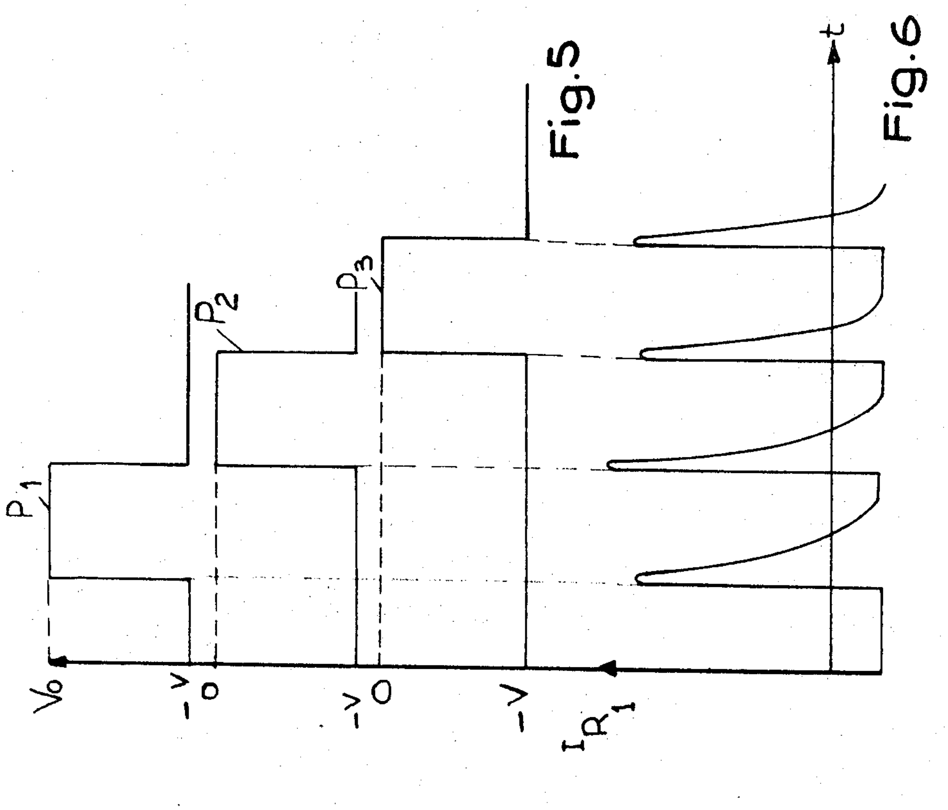

FIG. 5 shows the voltage pulses applied successively to the columns of capacitors. The first column receives the pulse $P_1$ which ceases when the second column receives the pulse $P_2$, etc. The leading edge of each pulse coincides in time with the trailing edge of the preceding pulse.

The switch C remains switched to a line, the line $j$, during the propagation of a pulse through the delay line. It follows therefrom that the resistance $R_i$, which integrates the currents of the diodes of the same line, has integrated all the currents, at the end of each cycle of the delay line.

There follows, in the resistance $R_j$, a set of pulses which are recurrent and whose height translates the illumination of each diode of the line (FIG. 6).

The switch passes then to the next line.

Figure 7:
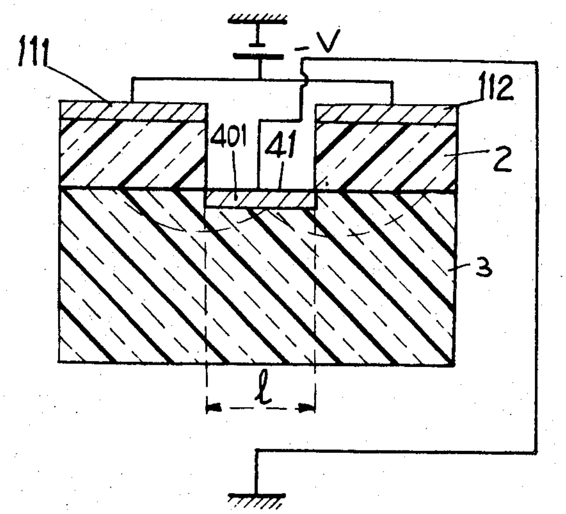
FIG. 7 shows in section an MOS capacitor.

FIG. 7 shows in cross section a modification of the embodiment of the MOS element suitable for the arrangement according to the invention. In this drawing, the same reference numerals designate the same elements as in FIG. 1. This insulating layer 2 has a groove 41 formed therein. At the bottom of this groove there is deposited an ohmic contact 401. The metal layer is divided into two pairs 111 and 112 surrounding the groove 41. It can be shown that, if groove 41 is given a sufficient width , everything happens as if these contacts were as in FIG. 1. In fact, under the action of the voltage −V, the electric charges flow from the contact 401 towards the contacts 111 and 112 and follow the paths inside the semiconductor (dotted lines in the drawing).

Figure 8:
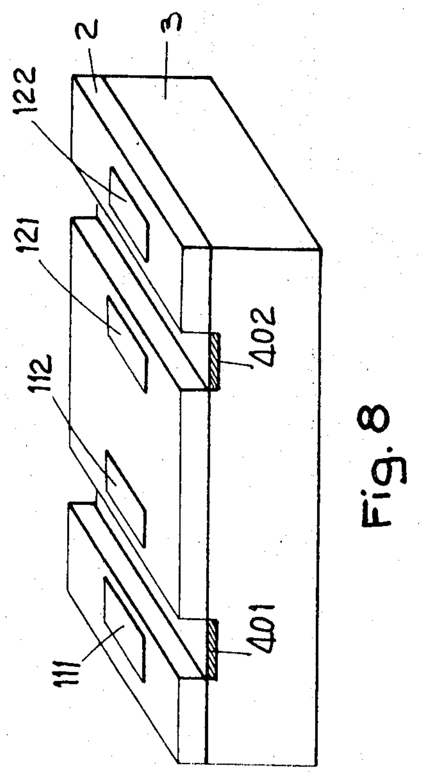
FIG. 8 Is a perspective view of the same capacitor.

FIG. 8 shows in perspective two MOS elements arranged in the same insulator semiconductor structure. The two ohmics contacts 401 and 402 have two parallel grooves, machined in the insulating body 2. At the bottom of these grooves, an impurity has been applied by diffusion, making the silicon less resistant, by means of a technique explained further below. Hence the bottom of each groove has an $n+$ layer.

On the upper surface of the layer 2 are deposited the contacts 111 and 112, surrounding the groove 401, and the contacts 121 and 122, surrounding the groove 402.

Figure 9:
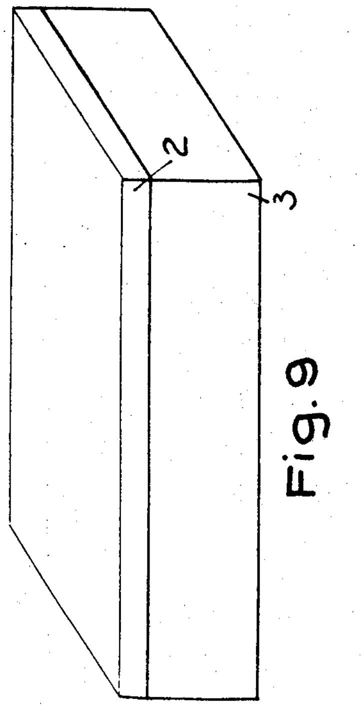
FIGS. 9, 10 and 11 show manufacturing stages of the same diodes.

The manufacturing method is as follows:

According to FIG. 9 a silicon plate 3 receives by oxidation a layer 2 of silica $SiO_2$.

Figure 10:
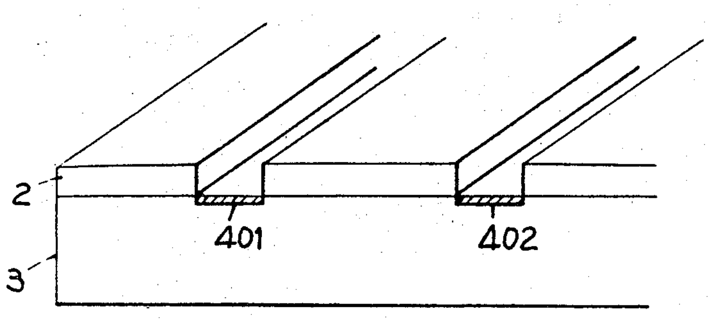
Figure 11:
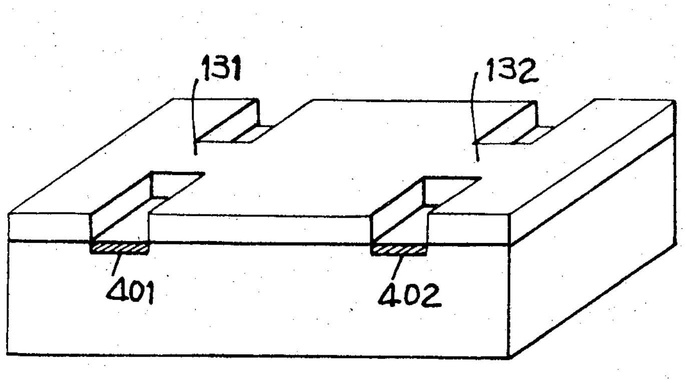

The grooves are cut, as shown in FIG. 10, in the oxide layer, by conventional methods for example by means of a photosensitive resin. Then the impurity is applied by diffusion. Next, the oxide layer is removed and the whole is then reoxidized as shown in FIG. 11, so that the center portion of the grooves is covered with oxide at 131 and 132.

Figure 12:
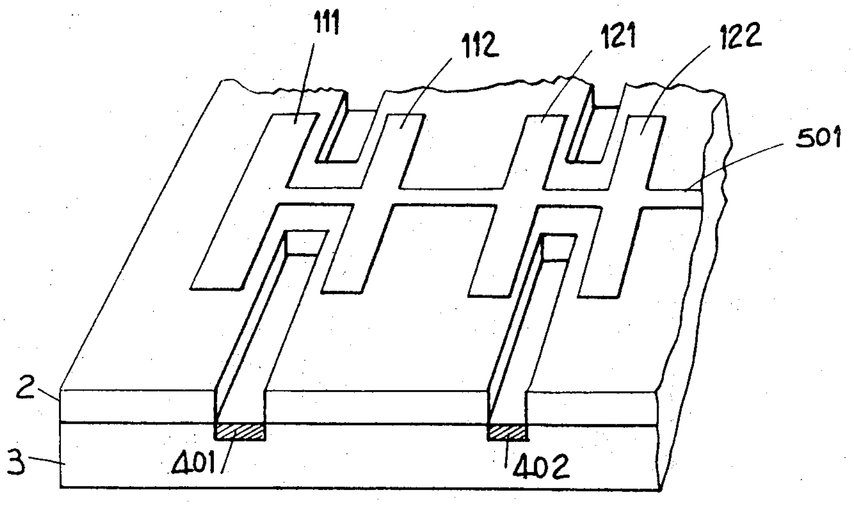
FIG. 12 shows in perspective an element according to the invention.
Figure 13:
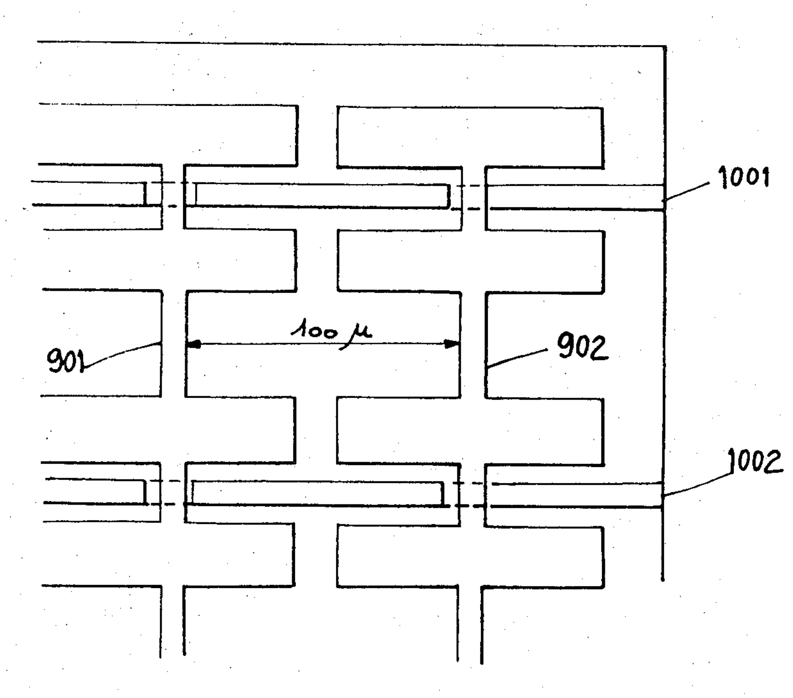
FIG. 13 shows a top view of the same element.

Then, a metallized layer is applied to the surface 2, as shown in FIG. 12. This metallization comprises strips 111 and 112, surrounding the groove 401, and strips 121 and 122 enclosing the groove 402 and a strip 501, perpendicular to the two preceding ones, and assuring the electrical connection. Each line of the MOS element is thus connected to its load resistance by a groove such as groove 401. Each column is connected to the output of its delay line by the connection 501. The last digit of the groove reference numeral indicates the number of the line of the matrix; the last digit of the reference numeral indicates the number of the column. The assembly of FIG. 13 shows, seen from above, two lines and two columns of the MOS element, e.g., the lines 1001 and 1002 and the columns 901 and 902.

If 100 lines and 100 columns are to be provided per square centimeter and if the line scanning period is equal to 50 ms, the gap between lines is 100 $\mu$ and pulses spaced apart by at 5 $\mu$s can appear at the load resistance (50ms × $10^{-4}$).

The invention thus provides, in a simple manner, a matrix, each element of which delivers a signal corresponding to the integrated light flux which it has received during the scanning period of one line.

Figure 14:
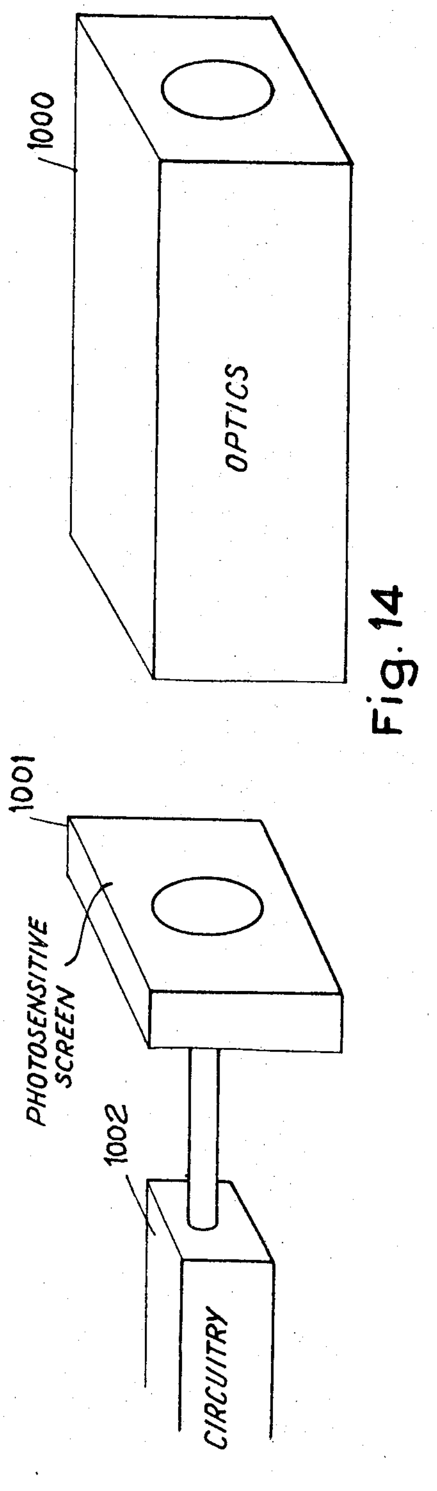
FIG. 14 shows diagrammatically a pickup or "camera" assembly according to the invention.

FIG. 14 shows an optical instrument 1000 forming on a sensitive surface 1001 according to the invention the optical image to be translated into television signals. The assembly 1002 represents the associated electronic arrangement. The whole performs the functions of a television camera.

Of course the invention is not limited to the embodiments described and shown which were given solely by way of example.

I claim:

1. A metal oxide semiconductor photosensitive device, comprising at least one metal oxide semiconductor capacitor having three layers including a first layer of doped semiconductor of a predetermined type of conductivity, a second layer of insulating material covering partly said first layer, and a third layer made of conductive material, covering at least partly said second layer; an ohmic contact on said first layer; means for biasing said third layer with respect to ground; means for applying between said third layer and said contact short pulses, canceling said biasing; and means connected to said ohmic contact for collecting the current flowing through said capacitor during said pulse upon illumination of said capacitor.

2. A photosensitive device as claimed in claim 1, comprising a plurality of capacitors.

3. A photosensitive device as claimed in claim 2, wherein said capacitors are arranged to form a matrix with a plurality of lines and a plurality of columns, said third layers of the capacitors of the same column being electrically connected; said ohmic contacts of each line being connected and means for collecting the current flowing in each line.

4. A device as claimed in claim 3, wherein said collecting means comprise load resistances respectively connected between said ohmic contacts and the ground.

5. A device as claimed in claim 3, wherein said pulse applying means comprise a pulse generator having an output, a delay line having an input connected to said output and a plurality of outputs respectively connected to said plurality of columns.

6. A device as claimed in claim 4, wherein said current collecting means comprise an amplifier having a input, a switching device having an output connected to said input of said amplifier and a inputs respectively connected to said plurality of load resistances, and means for successively connecting said plurality of inputs to said output of said switching means.

7. A device as claimed in claim 2, wherein said ohmic contact comprises a groove extending through said first layer, said third layer comprising two strips extending parallel to said groove, on each side of said groove.

8. A device as claimed in claim 7, wherein said groove has a center part, an insulating layer covering said center part, a third strip extending on said insulating layer and connecting said two strips.

9. A device as claimed in claim 8, in which said plurality of capacitors are integrated in the same substrate and form a matrix having lines and columns.

10. A device as claimed in claim 9, wherein the capacitors of the same column have in common the same groove, said capacitors of the same line having in common said strip.